UNITED STATES PATENT OFFICE.

G. W. MORSE, OF NEW YORK, N. Y.

IMPROVED PAINT FOR SHIPS' BOTTOMS.

Specification forming part of Letters Patent No. 58,458, dated October 2, 1866.

*To all whom it may concern:*

Be it known that I, G. W. MORSE, of the city and county and State of New York, have invented a new and Improved Paint Composition; and I do hereby declare that the following is a full, clear, and exact description thereof, which will enable others skilled in the art to make and use the same.

This invention relates to certain improvements in that class of paints in which antimony, or a compound of antimony, forms one of the chief ingredients.

My improved paint composition consists of antimony, lead, and what I term "cement copper," in combination with naphtha, benzine, and tar, and it is intended particularly for painting the hulls of vessels, or other parts exposed to sea-water or to the inclemencies of the atmosphere.

The proportion in which my ingredients are mixed together is about as follows: antimony, eighty parts; lead, fifteen parts; cement copper, five parts; naphtha, one part; benzine, one part; tar, two parts.

The cement copper I prepare as follows: take sheet-copper and throw sulphur on it and burn it. Thereby the copper is oxidized. Then put the same into pans, with a hot fire under them to drive out the sulphur. When the oxide of copper is red hot I pour it in cold water, which washes off the sulphate of copper. In the solution thus obtained dip iron plates on which is precipitated what I term "cement copper." This cement copper is scraped off and added to the other ingredients, which are ground together until they attain the desired fineness.

What I claim as new, and desire to secure by Letters Patent, is—

A paint composition made of the ingredients above specified.

G. W. MORSE.

Witnesses:
WM. F. MCNAMARA,
ALEX. F. ROBERTS.